United States Patent [19]

McLarty

[11] Patent Number: 5,419,642
[45] Date of Patent: May 30, 1995

[54] SEALING STRUCTURE FOR A BEARING

[75] Inventor: Daniel R. McLarty, Burlington, Conn.

[73] Assignee: The Torrington Company, Torrington, Conn.

[21] Appl. No.: 221,120

[22] Filed: Mar. 31, 1994

[51] Int. Cl.⁶ ............................................. F16C 33/76
[52] U.S. Cl. ...................... 384/486; 384/477
[58] Field of Search .............. 384/477, 484, 485, 486, 384/482, 145, 495, 496, 497, 498, 558

[56] References Cited

U.S. PATENT DOCUMENTS

| | | | |
|---|---|---|---|
| 3,700,296 | 10/1972 | Bugmann | 384/484 |
| 3,893,735 | 7/1975 | Brenner | 384/145 |
| 4,513,976 | 4/1985 | Bentley et al. | 277/25 |
| 4,566,811 | 1/1986 | Lundgren | 384/484 |
| 4,792,242 | 12/1988 | Colanzi et al. | 384/486 X |
| 4,958,942 | 9/1990 | Shimizu | 384/486 |
| 5,002,406 | 3/1991 | Morton et al. | 384/558 X |
| 5,005,992 | 4/1991 | Dreschmann et al. | 384/484 |
| 5,096,207 | 3/1992 | Seeh et al. | 277/35 |
| 5,149,207 | 9/1992 | Vignoito | 384/478 |

FOREIGN PATENT DOCUMENTS

| | | | |
|---|---|---|---|
| 614141 | 2/1961 | Canada | 384/498 |
| 562218 | 9/1993 | European Pat. Off. | 384/496 |
| 2717015 | 11/1978 | Germany | 384/495 |
| 699653 | 11/1953 | United Kingdom | 384/484 |
| 1233669 | 5/1971 | United Kingdom | 384/484 |
| 1762013 | 9/1992 | U.S.S.R. | 384/486 |

Primary Examiner—Thomas R. Hannon
Attorney, Agent, or Firm—John C. Bigler

[57] ABSTRACT

A resilient seal member, fixed to one of an inner bearing ring and an outer bearing ring, engages a contact member fixed to the other bearing ring to close an annulus between the bearing rings. The resilient seal member has at least one resilient lip forming an interference fit with a contact surface of the contact member. The contact surface is configured such that misalignment of the inner bearing ring with respect to the outer bearing ring does not significantly change the amount of interference between the resilient lip and the contact surface. The contact surface may be substantially spherical or conical.

21 Claims, 2 Drawing Sheets 5,419,642

SEALING STRUCTURE FOR A BEARING

BACKGROUND OF THE INVENTION

This invention relates generally to bearings and, more particularly, to contact-type sealing structures for use in bearings of various types.

Various contact-type sealing structures have been provided in bearing assemblies to retain lubricant and to exclude debris and other contaminants. Such bearing assemblies may have a fabric or other "plain" type bearing liner or, alternatively, a plurality of rolling elements provided between an inner bearing ring and an outer bearing ring to facilitate free rotation of one bearing ring with respect to the other. The sealing structure closes a radial space between the inner bearing ring and the outer bearing ring at an axial end of the bearing assembly.

Typically, a contact-type sealing structure comprises a resilient seal lip fixed to one bearing ring and extending against the other bearing ring to effect a wiping action. However, if the inner and outer bearing rings of such bearing assemblies become "cocked" or otherwise misaligned, either during installation or during use, the resilient seal lip may be moved away from the surface of the opposed bearing ring. As a result, the sealing structure may fail to retain lubricant or may allow debris and other contaminates to enter the bearing.

Other problems may result from misalignment of the inner and outer bearing ring. The resilient seal lip may be moved toward the opposed bearing ring, causing damage to the sealing structure or to the opposed bearing ring. For example, if the resilient seal lip is mounted on a metal shield fixed to one bearing ring, the metal shield may be forced against the other bearing ring during misalignment. Such damage may occur at a point diametrically opposite a point where the resilient seal lip moves away from the opposed bearing ring, as described above.

The foregoing illustrates limitations known to exist in present contact-type sealing structures for bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a sealing structure comprising resilient seal means adapted to be fixed to one of the inner and outer bearing rings for sealing an annulus between the bearing rings. A contact member, adapted to be fixed to the other of the inner and outer bearing rings, has a contact surface forming an interference fit with a resilient lip of the resilient seal means. The contact surface is configured such that misalignment of the inner and outer bearing rings does not significantly change the amount of interference between the resilient lip and the contact surface.

The foregoing and other aspects of the invention will be apparent from the following detailed description of the invention when considered with the accompanying drawing figures.

BRIEF DESCRIPTION OF THE DRAWING FIGURES

In this specification, identical elements in different embodiments are given identical reference characters.

DETAILED DESCRIPTION

Figure 1:
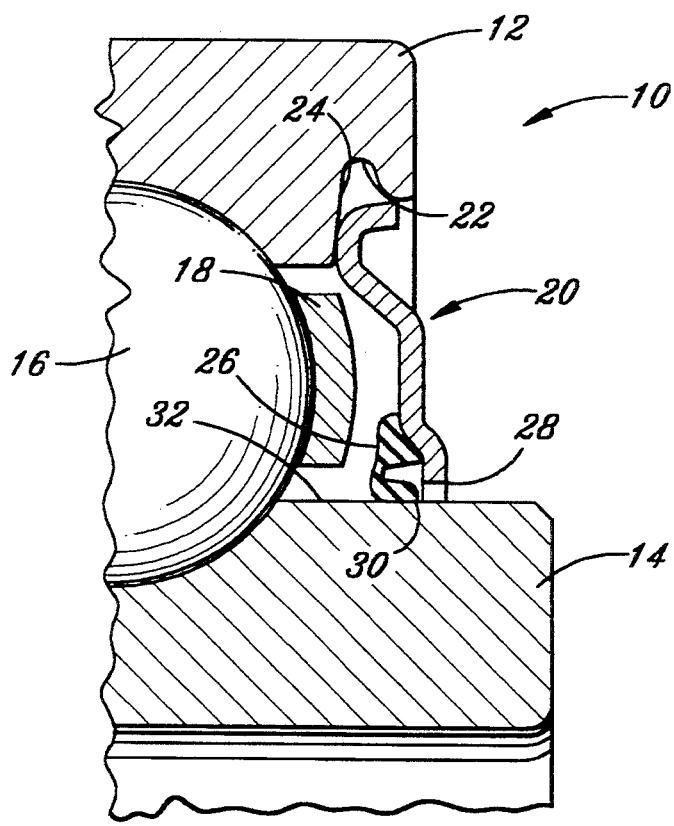
FIG. 1 is a cross sectional view of a portion of a bearing assembly illustrating a typical prior art sealing structure.

Referring now to the drawings, FIG. 1 illustrates a typical prior art sealing structure 10 closing a radial space between outer bearing ring 12 and inner bearing ring 14 of a bearing assembly. Rolling elements 16 are separated by retainer 18 and roll on raceways of outer and inner bearing rings 12 and 14 to provide free relative rotation of the bearing rings. Annular bearing shield 20 is mounted by press-fit in groove 22 of outer bearing ring 12 and is located axially by abutment with shoulder 24.

Prior art sealing structure 10 includes resilient seal member 26 bonded to bearing shield 22 near bearing shield inside diameter 28. Resilient seal lip 30 of resilient seal member 26 provides wiping contact with cylindrical contact surface 32 on the outside diameter of inner bearing ring 14. As discussed above, misalignment of inner bearing ring 14 with respect to outer bearing ring 12 may cause resilient seal lip 30 to move away from contact surface 32 or may cause bearing shield inside diameter 28 to move into contact surface 30, thereby damaging bearing shield 20 or inner bearing ring 14.

Figure 2:
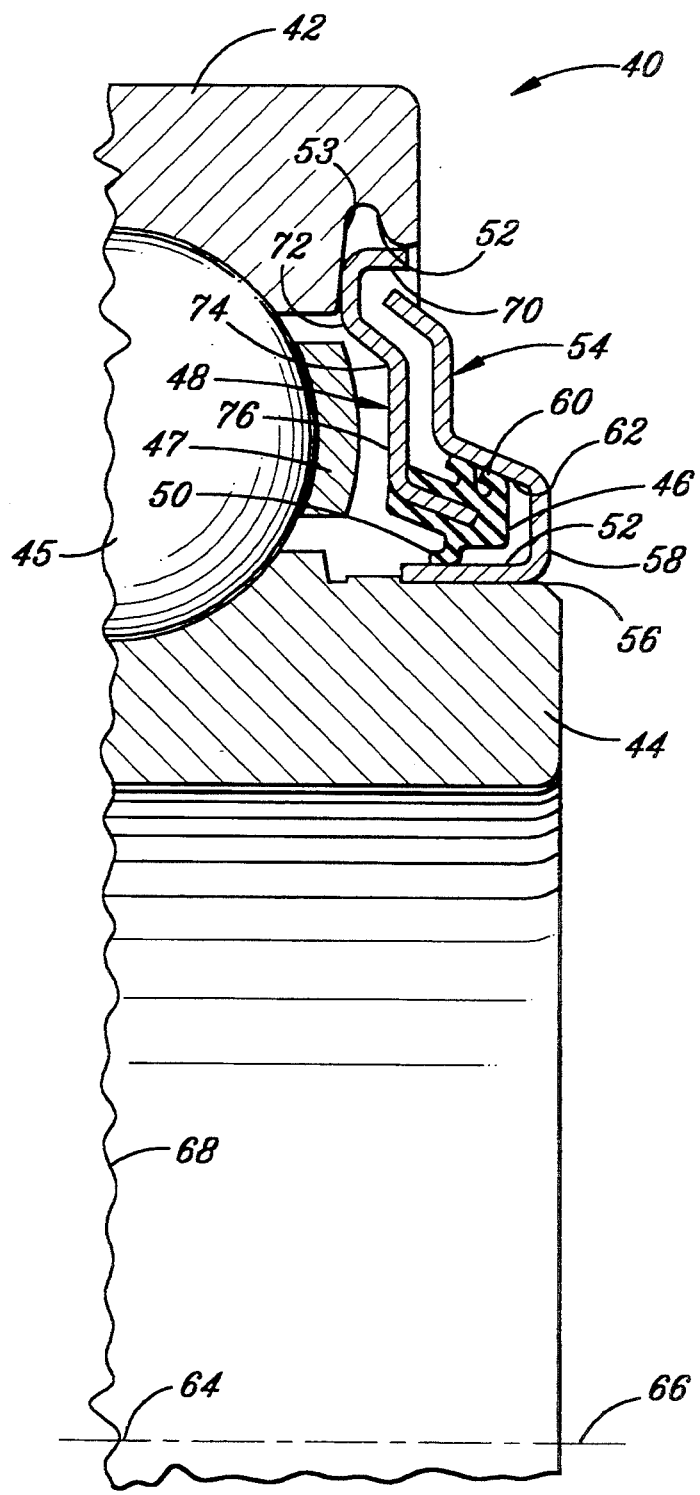
FIG. 2 is a cross sectional view of a portion of a bearing assembly illustrating one embodiment of sealing structure of the present invention.

In the embodiment of the present invention illustrated in FIG. 2, sealing structure 40 closes a radial space between outer bearing ring 42 and inner bearing ring 44 of a bearing assembly. Rolling elements 45 are separated by retainer 47 and roll on raceways of outer and inner bearing rings 42 and 44 to provide free relative rotation of the bearing rings. Annular bearing shield 48 is mounted by press-fit in groove 52 of outer bearing ring 42 and is located axially by abutment with shoulder 53.

Sealing structure 40 includes resilient seal member 46 bonded over the inside diameter of bearing shield 48. Resilient seal member 46 may include optional seal lip 50 that provides wiping contact with cylindrical contact surface 52. Cylindrical contact surface 52 is provided by a mounting flange of annular contact member 54 that is press-fit in recessed cylindrical surface 56 on the outside diameter of inner bearing ring 44. Contact member 54 extends radially outward from its mounting flange as face portion 58 and along the axially outward surface of bearing shield 48 to provide a labyrinth-type barrier.

At least one resilient seal lip 60 of resilient seal member 46 engages contact surface 62 of contact member 54 with an interference fit. Ideally, contact surface 62 has a spherically concave configuration, the center of the sphere being a point about which inner bearing ring 44 may pivot relative to outer bearing ring 42 during any misalignment that may occur. In the single-row ball bearing configuration shown in FIG. 2, pivoting may occur at pivot point 64 at the intersection of outer bearing ring axis 66 and plane 68 defined by the centers of rolling elements 45.

Because contact surface 62 is defined by a sphere centered at pivot point 64, the amount of interference between resilient seal lip 60 and contact surface 62 will remain constant, even during misalignment of inner bearing ring 44 with respect to outer bearing ring 42. As a result, performance of resilient seal lip 60 is not reduced during misalignment. Although a spherical surface is ideal, a similar result is achieved with an approximation of that ideal configuration. For example, contact surface 62 may be substantially conical, having a center axis coinciding with axis 66 and a surface tangent to the ideal spherical surface.

In the particular embodiment of FIG. 2, bearing shield 48 has curl or flange 70 along its outside diameter, extends radially inward along shoulder 53, next radially inward and axially outward forming ribs 72 and 74, then radially inward forming face portion 76, and finally radially inward and axially outward parallel to contact surface 62. Contact member 54 duplicates this general configuration. However, bearing shield 48 and contact member 54 may have various other forms and mountings on inner and outer bearing rings 42 and 44, provided that contact surface 62 has the required substantially spherical or conical configuration.

Figure 3:
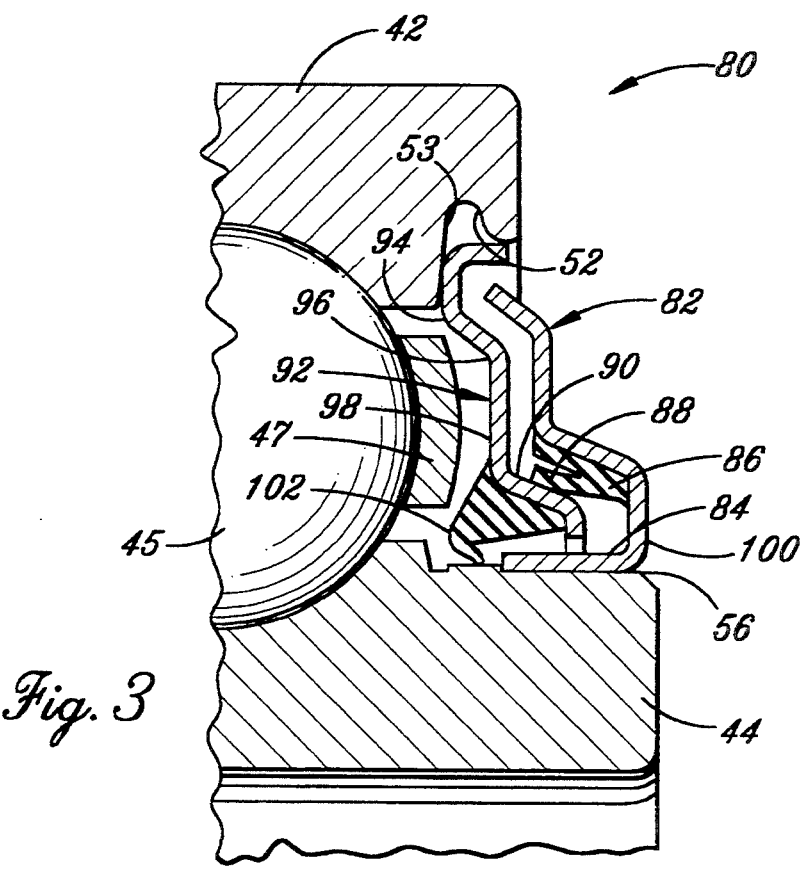
FIG. 3 is a cross sectional view of a portion of a bearing assembly illustrating a second embodiment of sealing structure of the present invention.

In the embodiment of the present invention illustrated in FIG. 3, sealing structure 80 closes the radial space between outer bearing ring 42 and inner bearing ring 44 with elements reversed. Instead of being mounted on outer bearing ring 42, as in the embodiment of FIG. 2, annular bearing shield 82 is mounted on inner bearing ring 44 by press-fit of bearing shield mounting flange 84 in recessed cylindrical surface 56. Resilient seal member 86 is bonded to bearing shield 82 and includes at least one resilient seal lip 88 for engagement with contact surface 90 of annular contact member 92.

Contact member 92 is press-fit in groove 52 of outer ring 42 and is located axially by abutment with shoulder 53. Contact member 92 extends radially inward and axially outward, forming ribs 94 and 96 and face portion 98. Contact surface 90 is substantially spherical or conical, similar to contact surface 62 of FIG. 2, with the center of the sphere being pivot point 64. Bearing shield 82 extends radially inward and axially outward from mounting flange 84 along face portion 100 and parallel to contact member 92 to form a labyrinth-type barrier. Optional resilient seal member 102 may be bonded to contact member 92 for wiping contact with inner bearing ring 44.

Although the illustrated embodiments show rolling elements, the present invention may also be provided in other forms of bearing assemblies with similar effect. Particular advantages may be achieved in applications in which misalignment of bearing rings is anticipated, such as in spherical plain bearings, for example. In some applications, for convenience, the pivot point defining the contact surface may be assumed to be the geometric center of the friction reducing means. The bearing shield and the contact member of the variations of the present invention may be conveniently and economically formed of sheet steel or similar material by pressing, stamping or other means.

From the above description, it will be apparent that the present invention provides an improved sealing structure that ensures proper wiping contact between a resilient seal lip and a contact surface even if the inner and outer bearing rings of a bearing assembly become "cocked" or otherwise misaligned, either during installation or during use. As a result, performance of the sealing structure is enhanced and damage to elements of the bearing assembly is reduced. Additionally, greater tolerances between bearing elements may be possible, reducing the cost of the bearing assembly.

Having described the invention, what is claimed is:

1. A sealing structure for a bearing having relatively rotatable inner and outer bearing rings, the outer bearing ring having an axis, the sealing structure comprising:
   a support member adapted to be fixed to one of the inner and outer bearing rings and extending toward the other of the inner and outer bearing rings;
   resilient seal means mounted on the support member for sealing an annulus between the inner and outer bearing rings, the resilient seal means including at least one resilient lip; and
   a contact member adapted to be fixed to the other of the inner and outer bearing rings, the contact member extending toward said one bearing ring and positioned relative to the support member such that a labyrinth seal is provided therebetween;
   the contact member having a contact surface forming an interference fit with the resilient lip, the contact surface being configured such that misalignment of the inner and outer bearing rings does not significantly change the amount of interference between the resilient lip and the contact surface.

2. The sealing structure according to claim 1, wherein the misalignment is defined by a pivoting of one bearing ring with respect to the other bearing ring and about a pivot point, and wherein the contact surface is substantially a spherical surface generated about the pivot point.

3. The sealing structure according to claim 1, wherein the misalignment is defined by a pivoting of one bearing ring with respect to the other bearing ring and about a pivot point, and wherein the contact surface is substantially a conical surface, the conical surface being substantially tangent to a sphere generated about the pivot point.

4. The sealing structure according to claim 1, wherein the bearing includes a plurality of rolling elements positioned between the inner and outer bearing rings and arranged in a plane intersecting the axis of the outer bearing ring at an intersection point, the contact surface being substantially a spherical surface generated about the intersection point.

5. The sealing structure according to claim 1, wherein the bearing includes a plurality of rolling elements positioned between the inner and outer bearing rings and arranged in a plane intersecting the axis of the outer bearing ring at an intersection point, the contact surface being substantially a conical surface substantially tangent to a sphere generated about the intersection point.

6. The sealing structure according to claim 1, wherein the bearing includes friction reducing means positioned between the inner and outer bearing rings for providing free relative rotation of the bearing rings with reduced friction, the friction reducing means having a geometric center lying on the axis of the outer bearing ring, the contact surface being substantially a spherical surface generated about the geometric center.

7. The sealing structure according to claim 1, wherein the bearing includes friction reducing means positioned between the inner and outer bearing rings for providing free relative rotation of the bearing rings with reduced friction, the friction reducing means having a geometric center lying on the axis of the outer bearing ring, the contact surface being substantially a conical surface substantially tangent to a sphere generated about the geometric center.

8. The sealing structure according to claim 1, wherein the contact member is axially outward from the support member and the contact surface is concave.

9. The sealing structure according to claim 1, wherein the contact member is axially inward from the support member and the contact surface is convex.

10. A bearing comprising:
an outer bearing ring having an axis;
an inner bearing ring;
a support member fixed to one of the inner and outer bearing rings and extending toward the other of the inner and outer bearing rings;
resilient seal means mounted on the support member for sealing an annulus between the inner and outer bearing rings, the resilient seal means including at least one resilient lip; and
a contact member adapted to be fixed to said other of the inner and outer bearing rings, the contact member extending toward said one bearing ring and positioned relative to the support member such that a labyrinth seal is provided therebetween;
the contact member having a contact surface forming an interference fit with the resilient lip, the contact surface being configured such that misalignment of the inner and outer bearing rings does not significantly change the amount of interference between the resilient lip and the contact surface.

11. The bearing according to claim 10, wherein the misalignment is defined by a pivoting of one bearing ring with respect to the other bearing ring and about a pivot point, and wherein the contact surface is substantially a spherical surface generated about the pivot point.

12. The bearing according to claim 10, wherein the misalignment is defined by a pivoting of one bearing ring with respect to the other bearing ring and about a pivot point, and wherein the contact surface is substantially a conical surface, the conical surface being substantially tangent to a sphere generated about the pivot point.

13. The sealing structure according to claim 10, wherein the misalignment is defined by a pivoting of one bearing ring with respect to the other bearing ring and about a pivot point, and wherein the contact surface is substantially a conical surface substantially tangent to a sphere generated about the pivot point.

14. The bearing according to claim 10, wherein the bearing includes a plurality of rolling elements positioned between the inner and outer bearing rings and arranged in a plane intersecting the axis of the outer bearing ring at an intersection point, the contact surface being substantially a spherical surface generated about the intersection point.

15. The bearing according to claim 10, wherein the bearing includes a plurality of rolling elements positioned between the inner and outer bearing rings and arranged in a plane intersecting the axis of the outer bearing ring at an intersection point, the contact surface being substantially a conical surface substantially tangent to a sphere generated about the intersection point.

16. The bearing according to claim 10, further comprising friction reducing means positioned between the inner and outer bearing rings for providing free relative rotation of the bearing rings with reduced friction, the friction reducing means having a geometric center lying on the axis of the outer bearing ring, the contact surface being substantially a spherical surface generated about the geometric center.

17. The bearing according to claim 10, further comprising friction reducing means positioned between the inner and outer bearing rings for providing free relative rotation of the bearing rings with reduced friction, the friction reducing means having a geometric center lying on the axis of the outer bearing ring, the contact surface being substantially a conical surface substantially tangent to a sphere generated about the geometric center.

18. The bearing according to claim 10, wherein the contact member is axially outward from the support member and the contact surface is concave.

19. The bearing according to claim 10, wherein the contact member is axially inward from the support member and the contact surface is convex.

20. A sealing structure for a bearing having relatively rotatable inner and outer bearing rings, the outer bearing ring having an axis, the sealing structure comprising:
resilient seal means adapted to be fixed to the outer bearing ring for sealing an annulus between the inner and outer bearing rings, the resilient seal means including at least one resilient lip extending radially and axially outward; and
a contact member adapted to be fixed to the inner bearing ring, the contact member having a concave contact surface forming an interference fit with the resilient lip, the contact surface being configured such that misalignment of the inner and outer bearing rings does not significantly change the amount of interference between the resilient lip and the contact surface.

21. A sealing structure for a bearing having relatively rotatable inner and outer bearing rings, the outer bearing ring having an axis, the sealing structure comprising:
resilient seal means adapted to be fixed to the inner bearing ring for sealing an annulus between the inner and outer bearing rings, the resilient seal means including at least one resilient lip extending radially and axially inward; and
a contact member adapted to be fixed to the outer bearing ring, the contact member having a convex contact surface forming an interference fit with the resilient lip, the contact surface being configured such that misalignment of the inner and outer bearing rings does not significantly change the amount of interference between the resilient lip and the contact surface.

* * * * *